United States Patent [19]

Durand

[11] Patent Number: 4,911,622

[45] Date of Patent: Mar. 27, 1990

[54] NUTATOR BEARING ASSEMBLY

[76] Inventor: John E. Durand, 26581 Dolorosa, Mission Viejo, Calif. 92691

[21] Appl. No.: 235,567

[22] Filed: Aug. 24, 1988

[51] Int. Cl.$^4$ .......................... F01C 1/02; F01C 21/02; G01F 3/08
[52] U.S. Cl. .......................................... 418/58; 73/256
[58] Field of Search ...................... 418/58, 208; 73/256

[56] References Cited

U.S. PATENT DOCUMENTS

| 96,262 | 10/1869 | Pilliner et al. | 418/58 |
| 336,140 | 2/1886 | Nash | 73/256 |
| 595,227 | 12/1897 | Wattles | 418/208 |
| 4,699,576 | 10/1987 | Durand | 418/58 |

*Primary Examiner*—John J. Vrablik

[57] ABSTRACT

An off center one spot nutator fulcrum rocking bearing assembly is presented. The assembly comprises a non rotating circular cylindrical fulcrum rod coupled at each end to a selected fixed point inside a nutating pump chamber. An off center non rotating rocking nutator fulcrum bearing has an interior circular cylindrical surface rotatably mating with and coupled around the exterior circular cylindrical surface of the rod, the bearing having at least two exterior surfaces parallel to the bearing axis including a first generally planar bearing surface parallel to the bearing axis and disposed closer to the bearing interior surface than any other bearing exterior surface parallel to said axis wherein said first bearing surface slideably nutatably couples to a nutator barrier, whereby the barrier rides on the first bearing surface during nutation causing the bearing to rock.

4 Claims, 1 Drawing Sheet

NUTATOR BEARING ASSEMBLY

BACKGROUND OF THE INVENTION

1. Field of the Invention

The present invention relates to off center one spot nutator fulcrum rocking bearings and bearing assemblies.

2. Description of the Prior Art

The prior art includes a variety of nutator assemblies, including, for example, a U.S. Pat. No. 4,699,576 by Durand and ten references cited in it. Few if any are of any commercial importance because of low wear life, among other reasons. During nutation, the fulcrum in effect saws on the barrier or strap coupling the two pistons of the nutator, since there is back and forth motion and the pressure is focused on a relatively small area.

One potential cure for the problem would be some type of roller bearing fulcrum to reduce pressure by spreading the contact between fulcrum and barrier over a greater area. Unfortunately, in practice, wear is uneven since the roller bearing is free to rotate or not rotate depending on mechanical conditions. The outer bearing surface soon begins to favor one point with ultimate consequent failure. The solution is a bearing which spreads the load over a greater area thereby reducing pressure and wear and with positive means for controlling motion.

The only prior art known to applicant which addresses this serious problem is Nash, Ser. No. 353,806 (1886) which more than 100 years ago utilized an adjustable fulcrum bearing surface. Nash failed since the adjustment merely multiplied a too short life by a small number. In the past 100 years, a number of patents have issued for a number of good looking nutating pumps, flow meters, or other devices. They all look good because of the inherent advantages of a nutator, but unfortunately, in spite of improvements in materials, none has had a sufficiently long life to be marketable.

Applicant first tried a sleeve bearing equivalent, which was an improvement. Unfortunately, over a period of time, the bearing does develop a preferred point of contact. On occasion turbulance or other forces cause the bearing to go off that preferred point of contact, causing temporary erratic behaviour. Nevertheless, use of a sleeve bearing as used by applicant substantially corrects this 100 year old problem which has prevented marketability of a class of nutating devices because of excess wear due to point contact of moving element and bearing, thereby changing calibration of this type of nutating flow meters or reducing efficiency of this type of nutating pump.

SUMMARY OF THE INVENTION

In a nutating positive displacement device capable of performing the typical positive displacement device functions such as pump, generator, flow meter, etc., a one spot nutator fulcrum rocking bearing mechanism is presented. The mechanism comprises a non rotating circular cylindrical fulcrum rod, and a non rotating rocking nutator fulcrum bearing.

The non rotating circular cylindrical fulcrum rod is coupled at each rod end to a selected fixed point inside a nutating pump chamber.

A magnetic element is coupled to the bearing adjacent the bearing surface farthest from the nutator barrier during operation such that the rocking action of the barrier causes the magnetic element to oscillate thereby enabling the magnetic element to generate an external signal.

The bearing length may be extended to increase the radius of oscillation of the magnetic element. By extended is meant that the bearing is a selected distance longer so that during oscillation of the magnetic element travel distance of the magnetic element is increased giving greater definition to each cycle.

The non rotating rocking nutator fulcrum bearing has an interior circular cylindrical surface parallel to, coaxial with, of incrementally greater diameter than and rotatably mating with and coupled around the exterior circular cylindrical surface of the rod, the bearing having at least two exterior surfaces parallel to the bearing axis including a first generally planar bearing surface parallel to the bearing axis and disposed substantially closer to the bearing interior surface than any other bearing exterior surface generally parallel to said bearing axis wherein said first bearing surface is capable of slideably nutatably coupling to a nutator barrier, whereby the barrier rides on the first bearing surface during nutation causing the bearing to rock.

In a first example of the invention the bearing is off center in relation to any plane defined by the nutator barrier.

In a nutating positive displacement device capable of performing the typical positive displacement device functions such as pump, generator, flow meter, etc., a nutator fulcrum rock and roll bearing, a non rotating circular cylindrical fulcrum rod is coupled at each end to a selected fixed point inside a nutating pump chamber. A sleeve type rocking and rolling nutator fulcrum bearing having an interior circular cylindrical surface parallel to, coaxial with, of incrementally greater diameter than and rotatably mating with and coupled around the exterior circular cylindrical surface of the rod is utilized. The bearing has a cylindrical exterior surface parallel to the bearing axis slideably nutatably coupled to a nutator barrier, whereby the barrier rides on the cylindrical exterior bearing surface during nutation causing the bearing to rock and roll during operation.

DRAWING DESCRIPTION

Reference should be made at this time to the following detailed description which should be read in conjunction with the following drawings of which:

DETAILED DESCRIPTION OF THE INVENTION

Figure 1:
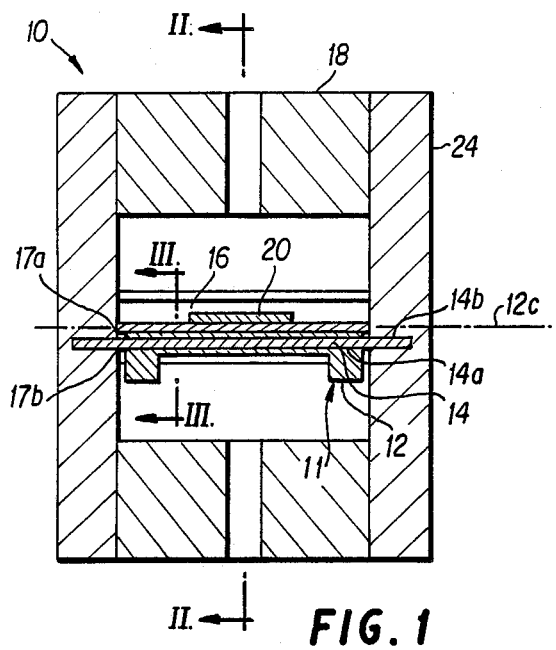
FIG. 1 is a partially cut away side view of the invention along the line I—I of FIG. 2.

Reference should be made at this time to FIGS. 1-5 which illustrate various views which should be considered when reading the following detailed description. In a nutating positive displacement device 10 capable of performing the typical positive displacement device functions such as pump, generator, flow meter, etc., a one spot nutator fulcrum rocking bearing mechanism 11 is presented. The mechanism 11 comprises a non rotating circular cylindrical fulcrum rod 14, and a non rotating rocking nutator fulcrum bearing 12.

The non rotating circular cylindrical fulcrum rod 14 is coupled at each rod end 14b to a selected fixed point inside a nutating pump chamber 17.

Figure 4:
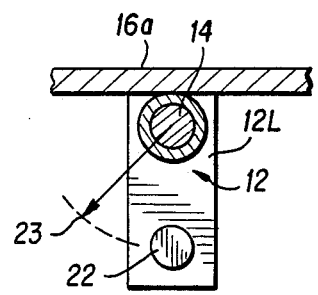
FIG. 4 is a detailed view of the fulcrum and bearing illustrating a view of a longer bearing.

As shown in FIG. 4 a magnetic element 22 is coupled to the bearing 12 adjacent the surface 12b farthest from the nutator 16 barrier 16a during operation such that the rocking action of the barrier 16a causes the magnetic element 22 to oscillate thereby enabling the magnetic element 22 to generate an external signal by conventional means not discussed in this application.

The bearing 12L as shown in FIG. 4 length may be extended to increase the radius of oscillation 23 of the magnetic element 22. By extended is meant that the bearing 12L is a selected distance longer than a non extended bearing 12 so that during oscillation of the magnetic element 22 travel distance of the magnetic element 22 is increased because of the greater radius 23 giving greater definition to each cycle.

Figure 3:
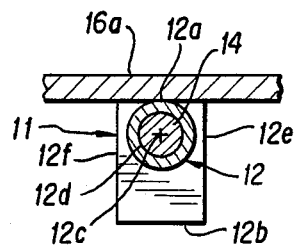
FIG. 3 is a detail view of the invention illustrating the bearing and fulcrum along the line III—III of FIG. 1.

The non rotating rocker nutator fulcrum bearing 12 as shown in FIG. 3 has an interior circular cylindrical surface 12d parallel to, coaxial with, of incrementally greater diameter than and rotatably mating with and coupled around the exterior circular cylindrical surface 14a of the rod 14, the bearing 12 having at least two exterior surfaces 12a, 12b parallel to the bearing axis 12c including a first generally planar bearing surface 12a parallel to the bearing axis 12c and disposed substantially closer to the bearing interior surface 12d than any other bearing exterior surface generally parallel to said bearing axis 12c wherein said first bearing surface 12a is capable of slideably nutatably coupling to a nutator barrier 16a, whereby the barrier 16a rides on the first bearing surface 12a during nutation causing the bearing 12 to rock.

In a first example of the invention the bearing 12 is off center in relation to any plane 16b defined by the nutator 16 barrier 16a.

Figure 5:
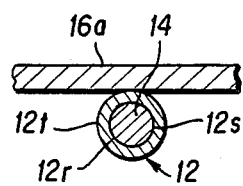
FIG. 5 illustrates a different example of the bearing of FIG. 3 illustrating a rock and roll bearing.

In the modification shown in FIG. 5 a nutating positive displacement device 10 capable of performing the typical positive displacement device functions such as pump, generator, flow meter, etc., a nutator 16 fulcrum 14 rock and roll bearing 12r, a non rotating circular cylindrical fulcrum rod 14 is coupled at each end 14b to a selected fixed point 17b inside a nutating pump 10 chamber 17. A sleeve type rocking and rolling nutator fulcrum bearing 12r having an interior circular cylindrical surface 12s parallel to, coaxial with, of incrementally greater diameter than and rotatably mating with and coupled around the exterior circular cylindrical surface 14a of the rod 14 is utilized. The bearing 12r has a cylindrical exterior surface 12t parallel to the bearing axis 12c slideably nutatably coupled to a nutator 16 barrier 16a, whereby the barrier 16a rides on the cylindrical exterior bearing surface 12t during nutation causing the bearing 12r to rock and roll during operation.

Figure 2:
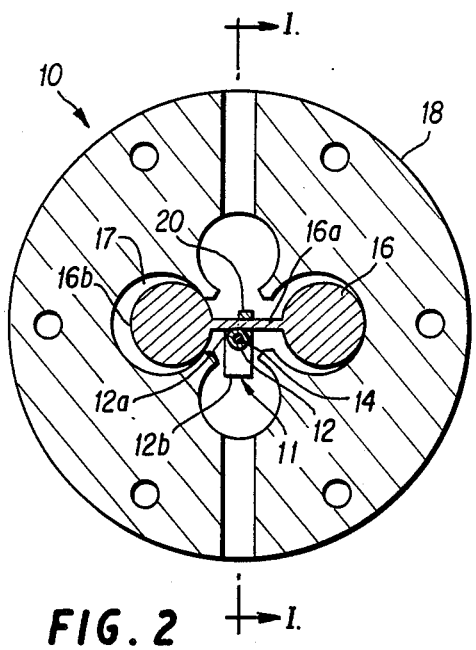
FIG. 2 is a partially cut away frontal view of the invention along the line II—II in FIG. 1.

Reference should be made at this time to FIG. 2 which illustrates a more conventional magnet 20 location in contrast to the location of magnet 22 in FIG. 4. The magnet 20 oscillates more linearly than magnet 22.

A particular example of the invention has been described herein with additional examples which are particularly useful. Other examples will be obvious to those skilled in the art. The invention is limited only by the following claims.

I claim:

1. In a nutating positive displacement device capable of performing the typical positive displacement device functions such as pump, generator, flow meter, etc., a one spot nutator fulcrum rocking bearing, comprising:
   a non rotating circular cylindrical fulcrum rod coupled at each end to a selected fixed point inside a nutating pump chamber defined by an interior surface of a housing;
   a non rotating rocking nutator fulcrum bearing having an interior circular cylindrical surface parallel to, coaxial with, of incrementally greater diameter than and rotatably mating with and coupled around the exterior circular cylindrical surface of the rod, the bearing having at least two exterior surfaces parallel to a bearing axis including a first generally planar bearing surface parallel to the bearing axis and disposed substantially closer to the bearing interior surface than any other bearing exterior surface generally parallel to said bearing axis wherein said first bearing surface is capable of slideably nutatably coupling to a nutator barrier, whereby the barrier rides on the first bearing surface during nutation causing the bearing to rock.

2. The invention of claim 1 wherein the bearing is off center in relation to any plane defined by the nutator barrier.

3. The invention of claim 1 wherein a magnetic element is coupled to the bearing adjacent the bearing surface farthest from the nutator barrier during operation such that the rocking action of the barrier causes the magnetic element to oscillate thereby enabling the magnetic element to generate an external signal.

4. The invention of claim 3 wherein the bearing length is extended to increase the radius of oscillation of the magnetic element.

* * * * *